United States Patent
Zhang

(10) Patent No.: US 10,326,712 B2
(45) Date of Patent: Jun. 18, 2019

(54) MULTICAST DATA PACKET FORWARDING

(71) Applicant: NEW H3C TECHNOLOGIES CO., LTD., Hangzhou (CN)

(72) Inventor: Yang Zhang, Beijing (CN)

(73) Assignee: New H3C Technologies Co., Ltd., Hangzhou (CN)

(*) Notice: Subject to any disclaimer, the term of this patent is extended or adjusted under 35 U.S.C. 154(b) by 0 days.

(21) Appl. No.: 15/571,817

(22) PCT Filed: May 4, 2016

(86) PCT No.: PCT/CN2016/080958
§ 371 (c)(1),
(2) Date: Nov. 3, 2017

(87) PCT Pub. No.: WO2016/177322
PCT Pub. Date: Nov. 10, 2016

(65) Prior Publication Data
US 2018/0351878 A1 Dec. 6, 2018

(30) Foreign Application Priority Data
May 4, 2015 (CN) .......................... 2015 1 0223272

(51) Int. Cl.
H04L 12/931 (2013.01)
H04L 12/46 (2006.01)
(Continued)

(52) U.S. Cl.
CPC ........ H04L 49/201 (2013.01); H04L 12/4641 (2013.01); H04L 45/16 (2013.01); H04L 49/25 (2013.01)

(58) Field of Classification Search
CPC ... H04L 49/201; H04L 12/4641; H04L 49/25; H04L 45/16
See application file for complete search history.

(56) References Cited

U.S. PATENT DOCUMENTS 7,933,268 B1    4/2011  Melman et al.
8,934,501 B2    1/2015  Ramesh
(Continued)

FOREIGN PATENT DOCUMENTS

CN    101094178 A    12/2007
CN    102970227 A    3/2013
(Continued)

OTHER PUBLICATIONS

Mahalingam, M. et al., "VXLAN: A Framework for Overlaying Virtualized Layer 2 Networks over Layer 3 Networks," Internet Engineering Task Force Internet Draft, Available Online at https://tools.ietf.org/html/draft-mahalingam-dutt-dcops-vxlan-09, Apr. 10, 2014, 23 pages.

(Continued)

Primary Examiner — Afshawn M Towfighi
(74) Attorney, Agent, or Firm — McCoy Russell LLP

(57) ABSTRACT

An I/O board of a VXLAN switch receives a multicast data packet having a VXLAN encapsulation, removes the VXLAN encapsulation, determines that layer 3 multicast forwarding is to be performed for the multicast data packet, and sends the multicast data packet to a fabric board of the VXLAN switch. The fabric board determines that layer 3 multicast forwarding is to be performed by the fabric board for the multicast data packet. When a multicast group member port corresponding to the multicast data packet is a VLAN port, the fabric board sends the multicast data packet to each I/O board on the VXLAN switch. Each I/O board sends the received multicast data packet to a VLAN according to a layer 3 multicast group entry used for forwarding the received multicast data packet. The layer 3 multicast group entry being included in a local layer 3 multicast group table.

17 Claims, 6 Drawing Sheets

(51) Int. Cl.
H04L 12/761 (2013.01)
H04L 12/947 (2013.01)

(56) References Cited

U.S. PATENT DOCUMENTS

| | | | |
|---|---|---|---|
| 2003/0210696 | A1 | 11/2003 | Goldflam |
| 2013/0329728 | A1 | 12/2013 | Ramesh |
| 2014/0192804 | A1 | 7/2014 | Ghanwani et al. |
| 2014/0280949 | A1 | 9/2014 | Anantharam et al. |
| 2015/0009992 | A1 | 1/2015 | Zhang |
| 2015/0010001 | A1 | 1/2015 | Duda et al. |
| 2015/0063353 | A1 | 3/2015 | Kapadia et al. |
| 2015/0103839 | A1 | 4/2015 | Chandrashekhar et al. |
| 2015/0124587 | A1* | 5/2015 | Pani ................. H04L 12/18 370/221 |
| 2015/0127701 | A1* | 5/2015 | Chu .................. H04L 45/22 709/201 |
| 2015/0188773 | A1* | 7/2015 | DeCusatis ........ G06F 9/45558 370/254 |
| 2015/0358232 | A1 | 12/2015 | Chen et al. |
| 2018/0097746 | A1 | 4/2018 | Zhang et al. |

FOREIGN PATENT DOCUMENTS

| | | |
|---|---|---|
| CN | 103095546 A | 5/2013 |
| CN | 103200069 A | 7/2013 |
| CN | 103200085 A | 7/2013 |
| CN | 103259727 A | 8/2013 |
| CN | 103814554 A | 5/2014 |
| CN | 103841023 A | 6/2014 |
| CN | 103873373 A | 6/2014 |
| CN | 104158718 A | 11/2014 |
| CN | 104170331 A | 11/2014 |
| CN | 104350714 A | 2/2015 |
| CN | 104426773 A | 3/2015 |
| EP | 2840736 A2 | 2/2015 |
| EP | 3001609 A1 | 3/2016 |
| JP | 2013526792 A | 6/2013 |
| JP | 2015039135 A | 2/2015 |
| JP | 2015043559 A | 3/2015 |
| JP | 2016082333 A | 5/2016 |
| WO | 03073283 A1 | 9/2003 |
| WO | 2014028094 A1 | 2/2014 |
| WO | 2014032620 A1 | 3/2014 |
| WO | 2014067280 A1 | 5/2014 |
| WO | 2014101394 A1 | 7/2014 |
| WO | 2014205784 A1 | 12/2014 |

OTHER PUBLICATIONS

ISA State Intellectual Property Office of the People's Republic of China, International Search Report Issued in Application No. PCT/CN2016/080934, dated Jul. 4, 2016, WIPO, 3 pages.
ISA State Intellectual Property Office of the People's Republic of China, International Search Report Issued in Application No. PCT/CN2016/080933, dated Jul. 22, 2016, WIPO, 3 pages.
ISA State Intellectual Property Office of the People's Republic of China, International Search Report Issued in Application No. PCT/CN2016/080958, dated Jul. 26, 2016, WIPO, 3 pages.
Japanese Patent Office, Office Action Issued in Application No. 2018-509962, dated Aug. 7, 2018, 7 pages. (Submitted with Machine Translation).
Nakamura, R. et al., "Ovstack: A Protocol Stack of Common Data Plane for Overlay Networks," Proceedings of the 2014 IEEE Network Operations and Management Symposium (NOMS), May 5, 2014, Krakow, Poland, 8 pages.
Mahalingam, M. et al., "Virtual eXtensible Local Area Network (VXLAN): A Framework for Overlaying Virtualized Layer 2 Networks over Layer 3 Networks," Internet Engineering Task Force, RFC Independent Submission 7348, Aug. 2014, 22 pages.
European Patent Office, Extended European Search Report Issued in Application No. 16789309.8, dated Feb. 2, 2018, Germany, 13 pages.
European Patent Office, Extended European Search Report Issued in Application No. 16789316.3, dated Feb. 5, 2018, Germany, 14 pages.
European Patent Office, Extended European Search Report Issued in Application No. 16789310.6, dated Mar. 19, 2018, Germany, 12 pages.
Japanese Patent Office, Office Action Issued in Application No. 2018509958, dated Nov. 6, 2018, 6 pages. (Submitted with Machine Translation).
State Intellectual Property Office of the People's Republic of China, Office Action and Search Report Issued in Application No. 201510221767.1, dated Nov. 26, 2018, 7 pages. (Submitted with Partial Translation).
State Intellectual Property Office of the People's Republic of China, Office Action and Search Report Issued in Application No. 201510223272.2, dated Nov. 30, 2018, 10 pages. (Submitted with Partial Translation).
State Intellectual Property Office of the People's Republic of China, Office Action and Search Report Issued in Application No. 201510220886.5, dated Dec. 5, 2018, 8 pages. (Submitted with Partial Translation).
Japanese Patent Office, Office Action Issued in Application No. 2018-509952, dated Jan. 15, 2019, 4 pages. (Submitted with Machine Translation).
European Patent Office, Office Action Issued in Application No. 16789310.6, dated Feb. 7, 2019, Germany, 11 pages.
European Patent Office, Office Action Issued in Application No. 16789309.8, dated Feb. 18, 2019, Netherlands, 5 pages.
European Patent Office, Office Action Issued in Application No. 16789316.3, dated Feb. 25, 2019, Netherlands, 8 pages.
United States Patent and Trademark Office, Office Action Issued in U.S. Appl. No. 15/571,820, dated Apr. 4, 2019, 36 pages.

\* cited by examiner

MULTICAST DATA PACKET FORWARDING

CROSS-REFERENCE TO RELATED APPLICATIONS

The present application is a U.S. National Phase of International Patent Application Serial No. PCT/CN2016/080958, entitled "MULTICAST DATA PACKET FORWARDING", filed on May 4, 2016. International Patent Application Serial No. PCT/CN2016/080958 claims priority to Chinese Patent Application No. 201510223272.2, entitled "Method and apparatus for forwarding a multicast data packet from a VXLAN to a VLAN", filed on May 4, 2015. The entire contents of each of the above-cited application are hereby incorporated by reference for all purposes.

BACKGROUND

Virtual eXtensible Local Area Network (VXLAN) technologies are layer 2 Virtual Private Network (VPN) technologies based on an Internet Protocol (IP) network and a "Media Access Control (MAC) in User Datagram Protocol (UDP)" encapsulation mode is used. Based on existing service providers or Enterprise IP networks, the VXLAN technologies may provide layer 2 interconnections for spreading physical sites and provide service isolation for different tenants. The VXLAN technologies are mainly used for data center networks.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to.

Generally, a frame-type switch includes a main board, an I/O board and a fabric board. The main board is a single board for implementing calculations of protocol stacks, distribution and control of forwarding entries, and device management. The I/O board is a single board for implementing data packet forwarding, e.g. internal forwarding and external forwarding of data packets. The fabric board is a single board for forwarding data packets and control packets between different boards or different chips within the frame-type switch. The chip on the fabric board has a packet forwarding function and is used to forwarding packets between different I/O boards.

The structure of a VXLAN switch is similar to the structure of the frame switch, and includes a main board, an I/O board and a fabric board. Generally, the number of the I/O boards is larger than 1.

In VXLAN applications, similarly with the frame-type switch, each chip on the fabric board of the VXLAN switch has the packet forwarding function and is used to forwarding packets between different I/O boards.

In some examples, one VXLAN switch is selected as a gateway and improvements are made to implement a layer 3 gateway function of the VXLAN. The selected VXLAN switch is called a gateway VXLAN switch.

The improvements of the gateway VXLAN switch are as follows.

The fabric board of the gateway VXLAN switch adopts chips having a forwarding function and various entry functions. The entry functions include at least a function of receiving and storing an entry distributed by the main board, a function of entry searching, and etc. In some examples, the fabric board may adopt switch chips adopted by the I/O board of the gateway VXLAN switch.

When the fabric board of the gateway VXLAN switch adopts the chips having the forwarding function and the entry functions, layer 3 forwarding of a multicast data packet entering the gateway VXLAN switch may be implemented via cooperation of the I/O board and the fabric board of the gateway VXLAN switch.

Figure 1:
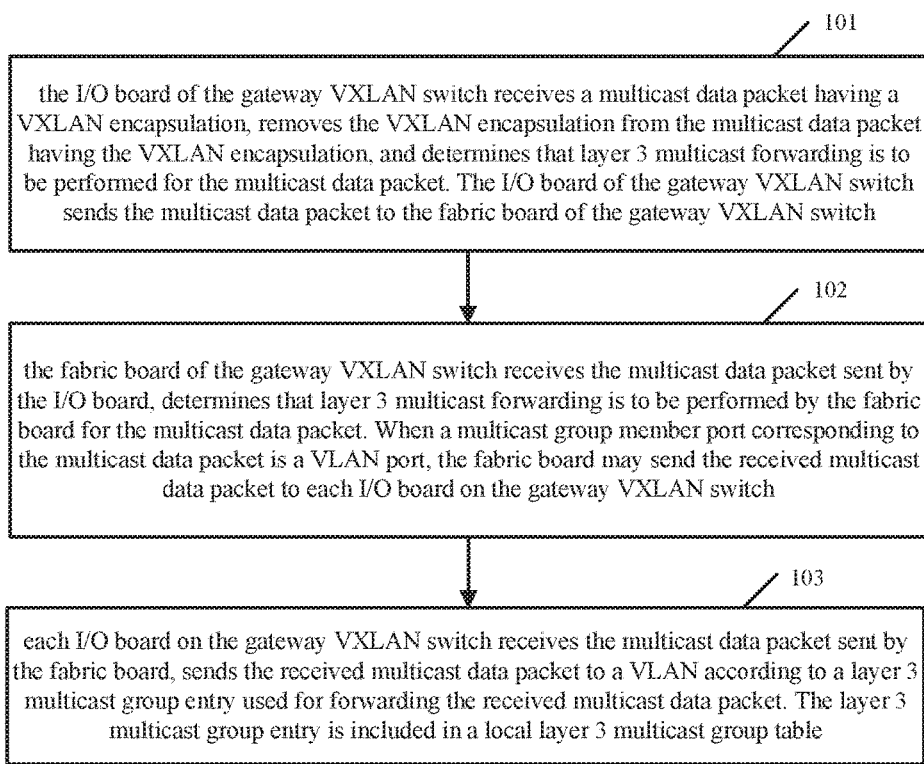
FIG. 1 is a flowchart illustrating a method for forwarding a multicast data packet according to various examples of the present disclosure.

FIG. 1 is a flowchart illustrating a method for forwarding a multicast data packet according to various examples of the present disclosure. The method is applied to a gateway VXLAN switch. In some examples, a fabric board of the gateway VXLAN switch adopts chips having a forwarding function and entry functions, e.g. switch chips adopted by an I/O board. As shown in FIG. 1, the method includes the following blocks.

At block 101, the I/O board of the gateway VXLAN switch receives a multicast data packet having a VXLAN encapsulation, removes the VXLAN encapsulation from the multicast data packet having the VXLAN encapsulation, and determines that layer 3 multicast forwarding is to be performed for the multicast data packet. The I/O board of the gateway VXLAN switch sends the multicast data packet to the fabric board of the gateway VXLAN switch.

In some examples, at block 101, before removing the VXLAN encapsulation from the multicast data packet having the VXLAN encapsulation, the I/O board of the gateway VXLAN switch may identify a virtual network identifier (VNID) from a header of the VXLAN encapsulation of the multicast data packet.

The I/O board of the gateway VXLAN switch may determine that the layer 3 multicast forwarding is to be performed for the multicast data packet according to the identified VNID.

In some examples, the I/O board of the gateway VXLAN switch may search a locally stored MAC (SMAC) table for a MAC entry matching with the VNID and a destination MAC address (DMAC) of the multicast data packet after removing the VXLAN encapsulation.

If the MAC entry is found, when an egress port of the MAC entry is a first virtual port, the destination MAC address of the multicast data packet is a multicast MAC address and a destination IP (DIP) address of the multicast data packet is a multicast IP address, the I/O board of the gateway VXLAN switch may determine that the layer 3 multicast forwarding is to may be performed for the multicast data packet.

The meanings of the first virtual port will be described thereinafter and will not be described herein.

In some examples, when the egress port of the MAC entry is not the first virtual port, if the destination MAC address (DIP) of the multicast data packet is the multicast MAC address and the destination IP address of the multicast data packet is the multicast IP address, the I/O board of the gateway VXLAN switch may forward the multicast data packet by using a layer 2 multicast data packet forwarding mode.

In some examples, the MAC table locally stored by the I/O board may be learned by the I/O board according to a MAC table learning mode, or may be directly configured by the main board, or may be learned by the main board according to a MAC table learning mode and distributed to the I/O board, which is not limited in the examples of the present disclosure.

Figure 2:
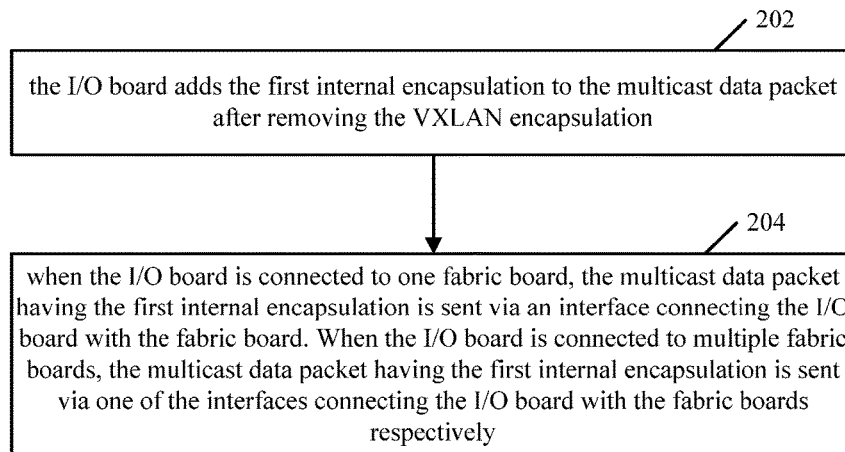
FIG. 2 is a flowchart illustrating a method of sending a multicast data packet to a fabric board according to various examples of the present disclosure.

In some examples, at block 101, the I/O board may add an internal encapsulation to the multicast data packet after removing the VXLAN encapsulation, so as to ensure that the multicast data packet is sent from the I/O board to the fabric board successfully. The internal encapsulation is called a first internal encapsulation hereinafter. At block 101, the I/O board may perform the following processing as shown in FIG. 2 when sending the multicast data packet to the fabric board of the gateway VXLAN switch.

At block 202, the I/O board adds the first internal encapsulation to the multicast data packet after removing the VXLAN encapsulation.

In some examples, the first internal encapsulation includes a first destination chip identifier and a first destination port identifier. The first destination chip identifier may be an identifier of a first virtual chip, and the first destination port identifier may be an identifier of a first virtual port.

In some examples, the first virtual chip may be a virtual chip configured in advance for indicting that the fabric board may continue to perform entry searching and multicast data packet forwarding. The first virtual port may be a virtual port configured in advance for indicting that the fabric board may continue to perform entry searching and multicast data packet forwarding.

At block 204, when the I/O board is connected to one fabric board, the multicast data packet having the first internal encapsulation is sent via an inner port connecting the I/O board with the fabric board. When the I/O board is connected to multiple fabric boards, the multicast data packet having the first internal encapsulation is sent via one of the inner ports connecting the I/O board with the fabric boards respectively.

In some examples, when the I/O board is connected to multiple fabric boards, the inner ports connecting the I/O board with the fabric boards respectively may be bound in a logic inner port group. At block 204, when sending the multicast data packet having the first internal encapsulation via one of the inner ports connecting the I/O board with the fabric boards respectively, the I/O board may select one inner port from the inner port group and send the multicast data packet having the first internal encapsulation via the selected inner port. Multiple modes may be used to select one inner port from the inner port group, e.g. selecting the inner port randomly, or selecting the inner port according to a certain algorithm, such as Hash algorithm.

After the processing at blocks 202 and 204 is performed, the I/O board of the gateway VXLAN switch may send the multicast data packet to the fabric board of the gateway VXLAN switch.

At block 102, the fabric board of the gateway VXLAN switch receives the multicast data packet sent by the I/O board, determines that layer 3 multicast forwarding is to be performed by the fabric board for the multicast data packet. When a multicast group member port corresponding to the multicast data packet is a Virtual Local Access Network (VLAN) port, the fabric board may send the received multicast data packet to each I/O board on the gateway VXLAN switch.

In some examples, the multicast group member port corresponding to the multicast data packet is included in a layer 3 multicast group entry matching with the multicast data packet. At block 204, the fabric board may search a local layer 3 multicast group table for the layer 3 multicast group entry matching with a destination IP address and a destination MAC address of the multicast data packet, so as to determine whether the multicast group member port in the searched-out layer 3 multicast group entry is the VLAN port.

In some examples, the VLAN port may be a single physical port or a port group formed by binding at least two physical ports. In the present disclosure, the single physical port and the port group are both referred to as the VLAN port.

In some examples, based on the first internal encapsulation at block 101, the fabric board may perform the following processing when determining that the layer 3 multicast forwarding is to be performed by the fabric board for the multicast data packet at block 102.

The fabric board may determine the first destination chip identifier and the first destination port identifier from the header of the first internal encapsulation. If the determined first destination chip identifier is the identifier of the first virtual chip, and the first destination port identifier is the identifier of the first virtual port, the fabric board may remove the first internal encapsulation from the multicast data packet having the first internal encapsulation. If the destination MAC address of the multicast data packet is the multicast MAC address and the destination IP address of the multicast data packet is the multicast IP address, the fabric board may determine that the layer 3 multicast forwarding is to be performed by the fabric board for the multicast data packet.

In some examples, if the determined first destination chip identifier is not the identifier of the first virtual chip and/or the first destination port identifier is not the identifier of the first virtual port, the fabric board may forward the multicast data packet according to the first destination port identifier without removing the first internal encapsulation from the multicast data packet having the first internal encapsulation.

In some examples, the local layer 3 multicast group table stored in the fabric board may be learned by the main board according to a MAC table learning mode and distributed to the fabric board.

Figure 3:
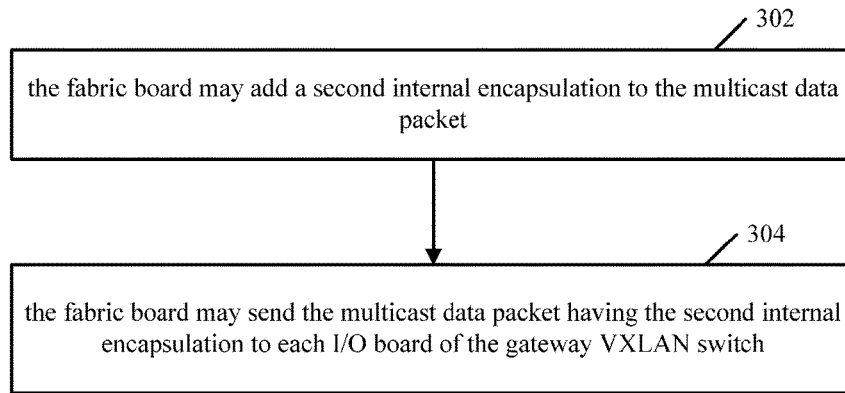
FIG. 3 is a flowchart illustrating a method of sending a multicast data packet to an I/O board according to various examples of the present disclosure.

In some examples, at block 102, the fabric board may perform the following processing as shown in FIG. 3 when sending the received multicast data packet to each I/O board of the VXLAN switch.

At block 302, the fabric board may add a second internal encapsulation to the multicast data packet.

In some examples, the second internal encapsulation may include a found index of the searched-out layer 3 multicast group entry.

At block 304, the fabric board may send the multicast data packet having the second internal encapsulation to each I/O board of the gateway VXLAN switch.

In some examples, the processing at block 304 may be implemented as follows.

The fabric board may copy the multicast data packet having the second internal encapsulation and the number of the copied multicast data packet having the second internal encapsulation is N−1, where N is the number of the I/O boards on the gateway VXLAN switch.

The fabric board may distribute the multicast data packet having the second internal encapsulation and the copied multicast data packet having the second internal encapsulation to the N I/O boards. Because contents of the multicast data packet having the second internal encapsulation and the copied multicast data packet having the second internal encapsulation are the same, the copied multicast data packet having the second internal encapsulation is called the multicast data packet having the second internal encapsulation in some examples.

Thus, the fabric board may send N copies of the multicast data packets having the second internal encapsulation to N I/O boards via inner ports connecting the fabric board with the N I/O boards respectively.

According to the descriptions at blocks 302 and 304, the multicast data packet received by the I/O board from the fabric board is the multicast data packet having the second internal encapsulation.

At block 103, each I/O board on the gateway VXLAN switch receives the multicast data packet sent by the fabric board, sends the received multicast data packet to a VLAN according to a layer 3 multicast group entry used for forwarding the received multicast data packet. The layer 3 multicast group entry is included in a local layer 3 multicast group table.

Figure 4:
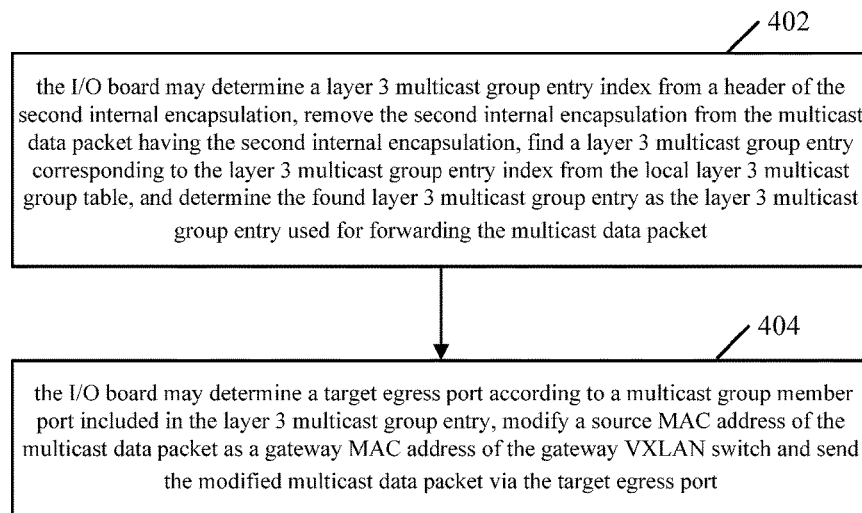
FIG. 4 is a flowchart illustrating a method of determining a target egress port according to various examples of the present disclosure.

In some examples, according to the mode used by the fabric board for sending the multicast data packet to each I/O board on the gateway VXLAN switch at block 102, each I/O board on the gateway VXLAN switch may send the multicast data packet to the VLAN according to the processing shown in FIG. 4.

At block 402, the I/O board may determine a layer 3 multicast group entry index from a header of the second internal encapsulation, remove the second internal encapsulation from the multicast data packet having the second internal encapsulation, find a layer 3 multicast group entry corresponding to the layer 3 multicast group entry index from the local layer 3 multicast group table, and determine the found layer 3 multicast group entry as the layer 3 multicast group entry used for forwarding the multicast data packet.

At block 404, the I/O board may determine a target egress port according to a multicast group member port included in the layer 3 multicast group entry, modify a source MAC address of the multicast data packet as a gateway MAC address of the gateway VXLAN switch and send the modified multicast data packet via the target egress port.

In some examples, the multicast group member port included in the layer 3 multicast group entry may be a VLAN port which may be a single physical port or a port group including at least two physical port. The I/O board may perform the following processing when determining the target egress port according to the multicast group member port included in the layer 3 multicast group entry at block 404.

When the multicast group member port is the single physical port, if the physical port is located at the I/O board, the physical port may be determined as the target egress port.

When the multicast group member port is the port group including at least two physical port, one physical port is selected from the port group according to a preconfigured port selecting algorithm. If the selected physical port is located at the I/O board, the selected physical port may be determined as the target egress port.

In some examples, the same port selecting algorithm may be configured for each I/O board on the gateway VXLAN switch, and thus each I/O board on the gateway VXLAN switch may use the same mode for selecting the physical port. For example, each I/O board may select the physical port according to the same Hash algorithm. As long as each I/O board may select the same physical port from the same port group, the algorithm used for selecting the physical port is not limited by the examples of the present disclosure.

In some examples, the layer 3 multicast group entry may include more than one multicast group member port. When more than one multicast group member port is included in the layer 3 multicast group entry, the number of the target egress ports determined according to the multicast group member ports may be N which is an integer larger than 1. The I/O board may copy the multicast data packet whose source MAC address is modified as the gateway MAC address of the gateway VXLAN switch according to the number of the determined target egress ports, and the number of the copied multicast data packet is N−1. The I/O board may distribute the multicast data packet and the copied multicast data packet to each target egress port, so that each target egress port may receive one copy of the multicast data packet.

In some examples, the local layer 3 multicast group entry stored in the I/O board may be learned by the main board according to a layer 3 multicast group entry learning mode and distributed to the I/O board.

As can be seen from the processing shown in FIG. 1, according to the examples of the present disclosure, the fabric board of the gateway VXLAN switch may adopt chips having the forwarding function and the entry functions, e.g. the switch chips adopted by the I/O board. After receiving the multicast data packet having the VXLAN encapsulation, the I/O board of the gateway VXLAN switch may remove the VXLAN encapsulation from the multicast data packet having the VXLAN encapsulation, and determine that the layer 3 multicast forwarding is to be performed for the multicast data packet. The I/O board of the gateway VXLAN switch may send the multicast data packet to the fabric board of the gateway VXLAN switch. The fabric board of the gateway VXLAN switch may search the local layer 3 multicast group table for the layer 3 multicast group entry matching with the destination IP address and the destination MAC address of the multicast data packet. When the multicast group member port corresponding to the multicast data packet in the layer 3 multicast group entry is the VLAN port, the fabric board may send the received multicast data packet to each I/O board of the gateway VXLAN switch, so that the I/O board may send the multicast data packet to the VLAN according to the locally stored layer 3 multicast group entry used for forwarding the multicast data packet. Hence, the layer 3 gateway function of the VXLAN is implemented by using the gateway VXLAN switch, and the multicast data packet may be forwarded from the VXLAN to the VLAN. In addition, the whole processing is implemented within the gateway VXLAN switch, no bandwidth resources are wasted, and wire speed forwarding of the multicast data packet is implemented.

Figure 5:
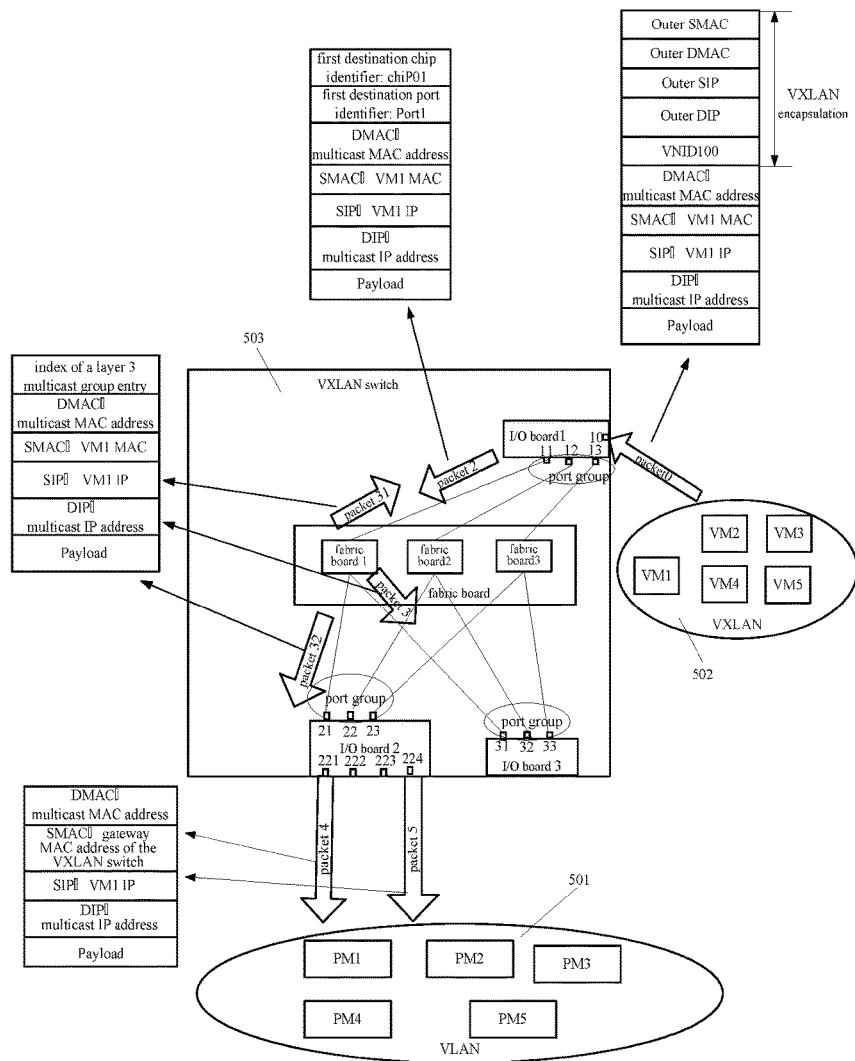
FIG. 5 is a diagram illustrating a networking structure for forwarding a multicast data packet according to various examples of the present disclosure.

The processing shown in FIG. 1 will be described by taking networking shown in FIG. 5 as an example. As shown in FIG. 5, a Physical Machine (PM) PM1, PM2, PM3, PM4 and PM5 are devices in a VLAN 501, a Virtual Machine (VM) VM1, VM2, VM3, VM4 and VM5 are devices in a VXLAN 502. The gateway VXLAN switch 503 is located between the VLAN 501 and the VXLAN 502, and includes I/O boards, fabric boards and a main board which is not shown in FIG. 5. The fabric board adopts the chip having a forwarding function and entry functions, e.g. a switch chip adopted by the I/O board. In the networking shown in FIG. 5, an I/O board 1, I/O board 2, and I/O board 3 are taken as examples.

The I/O board 1 of the gateway VXLAN switch 503 may receive a multicast data packet sent by the VM1 of the VXLAN 502 via a local port, e.g. a port10 shown in FIG. 5. In the example, the received multicast data packet is called a packet 0. The packet 0 has a VXLAN encapsulation, and the VXLAN encapsulation at least includes a VXLAN field and a header of the VXLAN outer layer. The VXLAN field may include an VNID of the VXLAN 502, e.g. the VNID100 shown in FIG. 5. The header of the VXLAN outer layer may include an outer ETH encapsulation which includes an outer source MAC address, an outer destination MAC address, an outer source IP (SIP) address, an outer destination IP address.

The I/O board 1 may obtain the VNID100 from the VXLAN encapsulation and remove the VXLAN encapsulation from the packet 0. In the example, a packet obtained after removing the VXLAN encapsulation from the packet 0 is called a packet 1.

The I/O board 1 may search a MAC table stored locally for a matched MAC entry by using the VNID 100 and a destination MAC address of the packet 1 as keywords.

The I/O board 1 may find the matched MAC entry, determine that an egress port of the matched MAC entry is a first virtual port, the destination MAC address of the packet 1 is a multicast MAC address, a destination IP address of the packet 1 is a multicast IP address, and thus determine that layer 3 multicast forwarding is to be performed for the packet 1.

The I/O board 1 may add a first internal encapsulation to the packet 1. In the first internal encapsulation, the first destination chip identifier is an identifier of a first virtual chip, e.g. chip01 as shown in FIG. 5, the first destination port identifier is an identifier of a first virtual port, e.g. Port1 as shown in FIG. 5. In the example, a packet obtained after adding the first internal encapsulation to the packet 1 is called a packet 2.

As shown in FIG. 5, the I/O board 1 is connected to the fabric boards via a port group including a port 11, a port 12 and a port 13. The I/O board 1 may select one port from the port group, e.g. the port 11, and send the packet 2 to the fabric board 1 via the port 11. The mode used by the I/O board 1 for selecting the port may be configured in advance.

For example, Hash algorithm may be used. In some example, the I/O board 1 may perform Hash calculation of a destination IP address of the packet 2, and select a port having a number corresponding to a result of the Hash calculation.

The fabric board 1 may receive the packet 2, and determine that the first destination chip identifier and the first destination port identifier in a header of the first internal encapsulation are chip01 and Port1 respectively, i.e. the identifier of the first virtual chip and the identifier of the first virtual port. The fabric board 1 may remove the first internal encapsulation, and the packet 1 is obtained.

The fabric board 1 may determine the destination MAC address of the packet 1 is the multicast MAC address, and the destination IP address of the packet 1 is the multicast IP address, and determine that the fabric board 1 need to perform layer 3 multicast forwarding for the packet 1.

The fabric board 1 may search a local layer 3 multicast group table for a layer 3 multicast group entry matching with the destination IP address and destination MAC address of the packet 1.

The fabric board 1 may discover four multicast group member ports are included in the layer 3 multicast group entry. For each multicast group member port, the fabric board 1 may determine that the multicast group member port is a VLAN port, add a second internal encapsulation to the packet 1. In the example, a packet obtained after adding the second internal encapsulation to the packet 1 is called a packet 3. The second internal encapsulation includes an index of a layer 3 multicast entry found by the fabric board 1.

As shown in FIG. 5, the gateway VXLAN switch 503 includes three I/O boards. The fabric board 1 may copy two copies of the packet 3 which are represented as a packet 31 and a packet 32.

The fabric board 1 may distribute the packet 31 to the I/O board 1 via an inner port connecting the fabric board 1 and the I/O board 1, distribute the packet 32 to the I/O board 2 via an inner port connecting the fabric board 1 and the I/O board 2, and distribute the packet 3 to the I/O board 3 via an inner port connecting the fabric board 1 and the I/O board 3.

In the following processing, the I/O board 2 receiving the packet 32 is taken as an example, and the I/O board 1 receiving the packet 31 and the I/O board 3 receiving the packet 3 may perform the processing similarly.

The I/O board 2 may receive the packet 32 sent by the fabric board, determine the index of the layer 3 multicast group entry from a header of the second internal encapsulation, remove the second internal encapsulation from the packet 32, and the packet 1 is obtained.

The I/O board 2 may determine a layer 3 multicast group entry included in a local layer 3 multicast group table according to the index of the layer 3 multicast group entry.

The I/O board 2 may determine a target egress port according to a multicast group member port included in the layer 3 multicast group entry. In the example, the determined target egress is a Port221 and Port224 on the I/O board 2, the multicast group member associated with the Port221 is the PM2 and the multicast group member associated with the Port224 is the PM4.

The I/O board 2 may copy the packet 1, and the copied packet 1 is represented as a packet 21.

The I/O board 2 may modify a source MAC address of the packet 21 as the gateway MAC address of the gateway VXLAN switch, and the modified packet 21 is called a packet 4. The I/O board 2 may send the packet 4 via the Port221.

The I/O board 2 may modify a source MAC address of the packet 1 as the gateway MAC address of the gateway VXLAN switch, and the modified packet 1 is called a packet 5. The I/O board 2 may send the packet 5 via the Port224.

Thus, the PM2 and PM4 may receive the multicast data packet sent by the VM1 in the VXLAN. Similarly, the multicast group member PM1 associated with the Port11 and the multicast group member PM3 associated with the Port13 may receive the multicast data packet sent by the VM1. Therefore, the multicast data packet is sent from the VXLAN to the VLAN by using the gateway VXLAN switch.

Figure 6:
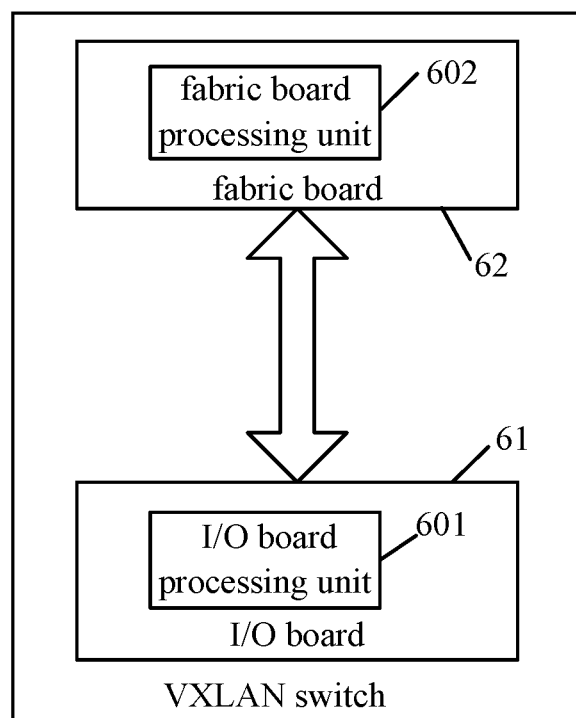
FIG. 6 is a diagram illustrating a VXLAN switch according to various examples of the present disclosure.

FIG. 6 is a diagram illustrating a VXLAN switch according to various examples of the present disclosure. As shown in FIG. 6, the VXLAN switch at least includes an I/O board 61 and a fabric board 62. In some examples, the VXLAN switch may include more than one I/O board 61 and more than one fabric board 62. The fabric board 62 adopts a chip having a forwarding function and entry functions. As shown in FIG. 6, the VXLAN switch includes an I/O board processing unit 601 located at the I/O board 61 and a fabric board processing unit 602 located at the fabric board 62.

The I/O board processing unit 601 is to receive a multicast data packet having a VXLAN encapsulation, remove the VXLAN encapsulation from the multicast data packet having the VXLAN encapsulation, determine that layer 3 multicast forwarding is to be performed for the multicast data packet, and send the multicast data packet to the fabric board 62 of the VXLAN switch. The I/O board processing unit 601 is further to receive a multicast data packet sent by the fabric board 62, send the received multicast data packet to a VLAN according to a layer 3 multicast group entry used for forwarding the received multicast data packet. The layer 3 multicast group entry is included in a local layer 3 multicast group table.

The fabric board processing unit 602 is to receive the multicast data packet sent by the I/O board 61, determine that layer 3 multicast forwarding is to be performed by the fabric board 62 for the multicast data packet. When a multicast group member port corresponding to the multicast data packet is a VLAN port, the fabric board processing unit 602 is to send the received multicast data packet to each I/O board 61 on the VXLAN switch.

In some examples, the multicast group member port corresponding to the multicast data packet is included in a layer 3 multicast group entry matching with the multicast data packet. The fabric board processing unit 602 is further to search a local layer 3 multicast group table for the layer 3 multicast group entry matching with a destination IP address and a destination MAC address of the multicast data packet.

In some examples, the I/O board processing unit 601 may determine that the layer 3 multicast forwarding is to be performed for the multicast data packet according to the following processing.

The I/O board processing unit 601 is to search a MAC table locally stored by the I/O board 61 for a MAC entry matching with the VNID and a destination MAC address of the multicast data packet after removing the VXLAN encapsulation. When an egress port of the MAC entry is a first virtual port, the destination MAC address of the multicast data packet is a multicast MAC address, and a destination IP address of the multicast data packet is a multicast IP address, the I/O board processing unit 601 may determine that the layer 3 multicast forwarding is to be performed for the multicast data packet.

In some examples, the I/O board processing unit 601 may send the multicast data packet to the fabric board 62 of the VXLAN switch according to the following processing.

The I/O board processing unit 601 is to add a first internal encapsulation to the multicast data packet after removing the VXLAN encapsulation. The first internal encapsulation includes a first destination chip identifier and a first destination port identifier. The first destination chip identifier may be an identifier of a first virtual chip, and the first destination port identifier may be an identifier of a first virtual port.

When the I/O board 61 is connected to one fabric board 62, the I/O board processing unit 601 is to send the multicast data packet having the first internal encapsulation via an inner port connecting the I/O board 61 with the fabric board 62. When the I/O board 61 is connected to multiple fabric boards 62, the I/O board processing unit 601 is to send the multicast data packet having the first internal encapsulation via one of the inner ports connecting the I/O board 61 with the fabric boards 62 respectively.

In some examples, the fabric board processing unit 602 may determine that layer 3 multicast forwarding is to be performed by the fabric board 62 for the multicast data packet according to the following processing.

The fabric board processing unit 602 is to determine the first destination chip identifier and the first destination port identifier from a header of the first internal encapsulation. If the determined first destination chip identifier is the identifier of the first virtual chip, and the first destination port identifier is the identifier of the first virtual port, the fabric board processing unit 602 is to remove the first internal encapsulation from the multicast data packet having the first internal encapsulation. If the destination MAC address of the multicast data packet is the multicast MAC address and the destination IP address of the multicast data packet is the multicast IP address, the fabric board processing unit 602 is to determine that layer 3 multicast forwarding is to be performed by the fabric board 62 for the multicast data packet.

In some examples, the fabric board processing unit 602 may send the received multicast data packet to each I/O board 61 on the VXLAN switch according to the following processing. The fabric board processing unit 602 is to add a second internal encapsulation to the multicast data packet, and send the multicast data packet having the second internal encapsulation to each I/O board 61 on the gateway VXLAN switch. The second internal encapsulation may include an index of the layer 3 multicast group entry.

In some examples, the I/O board processing unit 601 may send the received multicast data packet to the VLAN according to the following processing.

The I/O board processing unit 601 is to determine the index of the layer 3 multicast group entry from a header of the second internal encapsulation, remove the second internal encapsulation from the multicast data packet having the second internal encapsulation, find a layer 3 multicast group entry corresponding to the index of the layer 3 multicast group entry index from the local layer 3 multicast group table, and determine the found layer 3 multicast group entry as the layer 3 multicast group entry used for forwarding the multicast data packet.

The I/O board processing unit 601 is to determine a target egress port according to a multicast group member port included in the layer 3 multicast group entry, modify a source MAC address of the multicast data packet as a gateway MAC address of the gateway VXLAN switch, and send the modified multicast data packet via the target egress port.

In some examples, the I/O board processing unit 601 may determine the target egress port according to the multicast group member port included in the layer 3 multicast group entry by using the following processing.

When the multicast group member port is the single physical port, if the physical port is located at the I/O board 61, the physical port may be determined as the target egress port.

When the multicast group member port is the port group including at least two physical ports, one physical port is selected from the port group according to a preconfigured port selecting algorithm, if the selected physical port is located at the I/O board 61, the selected physical port may be determined as the target egress port.

Figure 7:
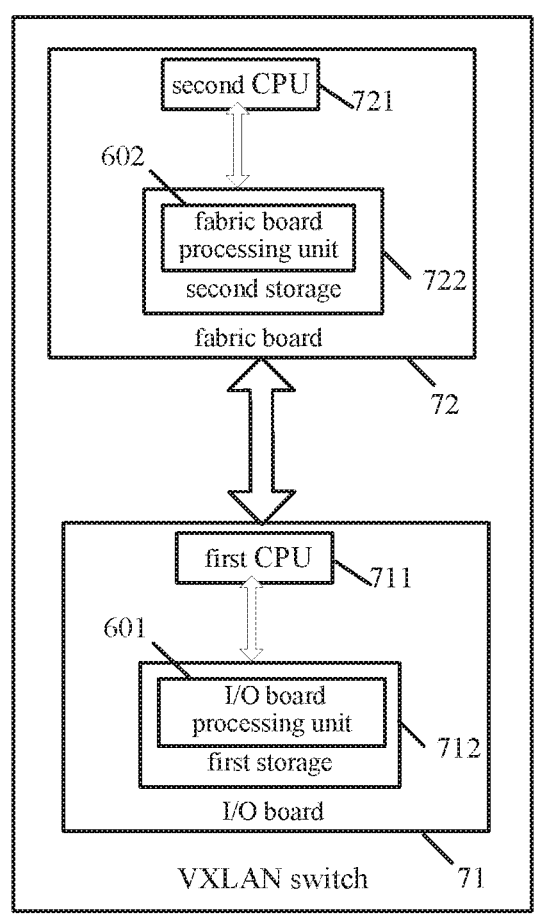
FIG. 7 is a diagram illustrating a hardware structure of a VXLAN switch according to various examples of the present disclosure.

FIG. 7 is a diagram illustrating a hardware structure of a VXLAN switch according to various examples of the present disclosure. As shown in FIG. 7, the hardware structure includes an I/O board 71 and a fabric board 72.

The I/O board 71 includes a first CPU 711 and a first storage 712.

The first storage 712 is to store the I/O board processing unit 601.

The first CPU 711 is to store a running control program of the I/O board processing unit 601, so as to control the I/O board processing unit 601 stored in the first storage 712 to perform the above operations of the I/O board processing unit 601, and the operations will not de described herein.

The I/O board 72 includes a second CPU 721 and a second storage 722.

The second storage 722 is to store the fabric board processing unit 602.

The second CPU 721 is to store a running control program of the fabric board processing unit 602, so as to control the fabric board processing unit 602 stored in the second storage 722 to perform the above operations of the fabric board processing unit 602, and the operations will not de described herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—their equivalents—in which all terms are meant in their broadest reasonable sense unless otherwise indicated.

The invention claimed is:

1. A method for forwarding a multicast data packet, comprising:
    receiving, by a first I/O board of an Virtual eXtensible Local Area Network (VXLAN) switch, a multicast data packet having a VXLAN encapsulation;
    removing, by the first I/O board of the VXLAN switch, the VXLAN encapsulation from the multicast data packet having the VXLAN encapsulation;
    determining, by the first I/O board, that layer 3 multicast forwarding is to be performed for the multicast data packet;
    sending, by the first I/O board, the multicast data packet to a fabric board of the VXLAN switch;
    receiving, by the fabric board of the VXLAN switch, the multicast data packet sent by the first I/O board;
    determining, by the fabric board of the VXLAN switch, that layer 3 multicast forwarding is to be performed by the fabric board for the multicast data packet;
    sending, by the fabric board of the VXLAN switch, the multicast data packet to each I/O board on the VXLAN switch when a multicast group member port corresponding to the multicast data packet is a Virtual Local Area Network (VLAN) port; and
    receiving, by a second I/O board on the VXLAN switch, the multicast data packet sent by the fabric board;
    sending, by the second I/O board, the received multicast data packet to a VLAN according to a layer 3 multicast group entry used for forwarding the received multicast data packet, wherein the layer 3 multicast group entry is included in a local layer 3 multicast group table.

2. The method of claim 1, wherein
    the multicast group member port corresponding to the multicast data packet is included in a layer 3 multicast group entry matching with the multicast data packet; and
    the method further comprises:
        searching, by the fabric board of the VXLAN switch, a local layer 3 multicast group table for the layer 3 multicast group entry matching with a destination IP address and a destination MAC address of the multicast data packet.

3. The method of claim 2, wherein sending the multicast data packet to each I/O board on the VXLAN switch comprises:
    adding, by the fabric board of the VXLAN switch, a second internal encapsulation to the multicast data packet, and
    sending, by the fabric board of the VXLAN switch, the multicast data packet having the second internal encapsulation to each I/O board on the gateway VXLAN switch, wherein the second internal encapsulation comprises an index of the layer 3 multicast group entry.

4. The method of claim 3, wherein sending the received multicast data packet to the VLAN according to the layer 3 multicast group entry used for forwarding the received multicast data packet comprises:
    determining, by the second I/O board, an index of the layer 3 multicast group entry from a header of the second internal encapsulation;
    removing, by the second I/O board, the second internal encapsulation from the multicast data packet having the second internal encapsulation;
    finding, by the second I/O board, a layer 3 multicast group entry corresponding to the index of the layer 3 multicast group entry from the local layer 3 multicast group table;
    taking, by the second I/O board, the found layer 3 multicast group entry as the layer 3 multicast group entry used for forwarding the multicast data packet;
    determining, by the second I/O board, a target egress port according to a multicast group member port included in the layer 3 multicast group entry;
    modifying, by the second I/O board, a source MAC address of the multicast data packet as a gateway MAC address of the gateway VXLAN switch; and
    sending, by the second I/O board, the modified multicast data packet via the target egress port.

5. The method of claim 4, wherein determining the target egress port according to the multicast group member port included in the layer 3 multicast group entry comprises:
when the multicast group member port is a single physical port, if the physical port is located at the second I/O board, determining, by the second I/O board, the physical port as the target egress port;
when the multicast group member port is a port group including at least two physical ports,
selecting, by the second I/O board, one physical port from the port group according to a preconfigured port selecting algorithm; and
taking, by the second I/O board, the selected physical port as the target egress port if the selected physical port is located at the second I/O board.

6. The method of claim 1, further comprising:
identifying, by the first I/O board, a virtual network identifier (VNID) from a header of the VXLAN encapsulation of the multicast data packet, before removing the VXLAN encapsulation from the multicast data packet having the VXLAN encapsulation;
wherein determining that the layer 3 multicast forwarding is to be performed for the multicast data packet comprises:
searching, by the first I/O board, a MAC table locally stored by the first I/O board for a MAC entry matching with the VNID and a destination MAC address of the multicast data packet after removing the VXLAN encapsulation;
determining, by the first I/O board, that the layer 3 multicast forwarding is to be performed for the multicast data packet when an egress port of the MAC entry is a first virtual port, the destination MAC address of the multicast data packet is a multicast MAC address, and a destination IP address of the multicast data packet is a multicast IP address.

7. The method of claim 1, wherein sending the multicast data packet to the fabric board of the VXLAN switch comprises:
adding, by the first I/O board of the VXLAN switch, a first internal encapsulation to the multicast data packet after removing the VXLAN encapsulation, wherein the first internal encapsulation comprises:
a first destination chip identifier indicating an identifier of a first virtual chip, and
a first destination port identifier indicating being an identifier of a first virtual port;
when the first I/O board is connected to one fabric board, sending, by the first I/O board, the multicast data packet having the first internal encapsulation via an inner port connecting the first I/O board with the fabric board;
when the first I/O board is connected to multiple fabric boards, sending, by the first I/O board, the multicast data packet having the first internal encapsulation via one of the inner ports connecting the first I/O board with the fabric boards respectively.

8. The method of claim 7, wherein determining that layer 3 multicast forwarding is to be performed by the fabric board for the multicast data packet comprises:
determining, by the fabric board of the VXLAN switch, the first destination chip identifier and the first destination port identifier from a header of the first internal encapsulation;
removing, by the fabric board of the VXLAN switch, the first internal encapsulation from the multicast data packet having the first internal encapsulation if the determined first destination chip identifier is the identifier of the first virtual chip and the first destination port identifier is the identifier of the first virtual port;
determining, by the fabric board of the VXLAN switch, that layer 3 multicast forwarding is to be performed by the fabric board for the multicast data packet if the destination MAC address of the multicast data packet is the multicast MAC address and the destination IP address of the multicast data packet is the multicast IP address.

9. A VXLAN switch, comprising:
an I/O board processing unit, which is located at an I/O board of the VXLAN switch and configured to
receive a multicast data packet having a VXLAN encapsulation,
remove the VXLAN encapsulation from the multicast data packet having the VXLAN encapsulation,
determine that layer 3 multicast forwarding is to be performed for the multicast data packet, and
send the multicast data packet to a fabric board of the VXLAN switch;
a fabric board processing unit, which is located at the fabric board of the VXLAN switch and configured to
receive the multicast data packet sent by the I/O board,
determine that layer 3 multicast forwarding is to be performed by the fabric board for the multicast data packet;
send the received multicast data packet to each I/O board on the VXLAN switch when a multicast group member port corresponding to the multicast data packet is a VLAN port,
wherein, the I/O board processing unit is further configured to
receive a multicast data packet from the fabric board; and
send the received multicast data packet to a VLAN according to a layer 3 multicast group entry used for forwarding the received multicast data packet, wherein the layer 3 multicast group entry is included in a local layer 3 multicast group table.

10. The VXLAN switch of claim 9, wherein
the multicast group member port corresponding to the multicast data packet is included in a layer 3 multicast group entry matching with the multicast data packet; and
the fabric board processing unit is further configured to search a local layer 3 multicast group table for the layer 3 multicast group entry matching with a destination IP address and a destination MAC address of the multicast data packet.

11. The VXLAN switch of claim 10, wherein the fabric board processing unit is configured to send the received multicast data packet to each I/O board on the VXLAN switch through a process of:
adding a second internal encapsulation to the multicast data packed;
sending the multicast data packet having the second internal encapsulation to each I/O board on the gateway VXLAN switch, wherein the second internal encapsulation comprises an index of the layer 3 multicast group entry.

12. The VXLAN switch of claim 11, wherein the I/O board processing unit is configured to send the received multicast data packet to the VLAN according to the layer 3 multicast group entry used for forwarding the received multicast data packet through a process of:
determining an index of the layer 3 multicast group entry from a header of the second internal encapsulation;

removing the second internal encapsulation from the multicast data packet having the second internal encapsulation, finding a layer 3 multicast group entry corresponding to the index of the layer 3 multicast group entry from the local layer 3 multicast group table;

taking the found layer 3 multicast group entry as the layer 3 multicast group entry used for forwarding the multicast data packet;

determining a target egress port according to a multicast group member port included in the layer 3 multicast group entry;

modifying a source MAC address of the multicast data packet as a gateway MAC address of the gateway VXLAN switch; and sending the modified multicast data packet via the target egress port.

13. The VXLAN switch of claim 12, wherein the I/O board processing unit is configured to determine the target egress port according to the multicast group member port included in the layer 3 multicast group entry through a process of:

when the multicast group member port is a single physical port located at the I/O board, determining the physical port as the target egress port;

when the multicast group member port is a port group including at least two physical ports, selecting one physical port from the port group according to a preconfigured port selecting algorithm; and taking the selected physical port as the target egress port if the selected physical port is located at the I/O board.

14. The VXLAN switch of claim 9, wherein the I/O board processing unit is further configured to identify a VNID from a header of the VXLAN encapsulation of the multicast data packet before removing the VXLAN encapsulation from the multicast data packet having the VXLAN encapsulation;

the I/O board processing unit is configured to determine that the layer 3 multicast forwarding is to be performed for the multicast data packet through a process of:

searching a MAC table locally stored by the I/O board for a MAC entry matching with the VNID and a destination MAC address of the multicast data packet after removing the VXLAN encapsulation;

determining that the layer 3 multicast forwarding is to be performed for the multicast data packet when an egress port of the MAC entry is a first virtual port, the destination MAC address of the multicast data packet is a multicast MAC address, and a destination IP address of the multicast data packet is a multicast IP address.

15. The VXLAN switch of claim 9, wherein the I/O board processing unit is configured to send the multicast data packet to the fabric board of the VXLAN switch through a process of:

adding a first internal encapsulation to the multicast data packet after removing the VXLAN encapsulation, wherein the first internal encapsulation comprises a first destination chip identifier indicating an identifier of a first virtual chip, and a first destination port identifier indicating an identifier of a first virtual port; when the I/O board is connected to one fabric board, sending the multicast data packet having the first internal encapsulation via an inner port connecting the I/O board with the fabric board;

when the I/O board is connected to multiple fabric boards, sending the multicast data packet having the first internal encapsulation via one of the inner ports connecting the I/O board with the fabric boards respectively.

16. The VXLAN switch of claim 15, wherein the fabric board processing unit is configured to determine that layer 3 multicast forwarding is to be performed by the fabric board for the multicast data packet through a process of:

determining the first destination chip identifier and the first destination port identifier from a header of the first internal encapsulation;

removing the first internal encapsulation from the multicast data packet having the first internal encapsulation if the determined first destination chip identifier is the identifier of the first virtual chip and the first destination port identifier is the identifier of the first virtual port;

determining that layer 3 multicast forwarding is to be performed by the fabric board for the multicast data packet if the destination MAC address of the multicast data packet is the multicast MAC address and the destination IP address of the multicast data packet is the multicast IP address.

17. An apparatus for forwarding a multicast data packet, comprising:

an I/O board with a first processor, and a first memory for storing instructions executable by the first processor;

wherein the first processor is configured to perform the steps of receiving a multicast data packet having a VXLAN encapsulation;

removing the VXLAN encapsulation from the multicast data packet having the VXLAN encapsulation;

determining that layer 3 multicast forwarding is to be performed for the multicast data packet; and sending the multicast data packet to a fabric board of the VXLAN switch;

an fabric board with a second processor, and a second memory for storing instructions executable by the second processor;

wherein the second processor is configured to perform the steps of receiving the multicast data packet sent by the I/O board, determining that layer 3 multicast forwarding is to be performed by the fabric board for the multicast data packet;

sending the multicast data packet to each I/O board on the VXLAN switch when a multicast group member port corresponding to the multicast data packet is a Virtual Local Area Network (VLAN) port;

wherein the first processor is further adapted to perform the steps of receiving a multicast data packet sent by the fabric board; and sending the received multicast data packet to a VLAN according to a layer 3 multicast group entry used for forwarding the received multicast data packet, wherein the layer 3 multicast group entry is included in a local layer 3 multicast group table.

* * * * *